United States Patent [19]

Gordon et al.

[11] 3,717,033
[45] Feb. 20, 1973

[54] ULTRASONIC APPARATUS, PARTICULARLY FOR THERMOMETRY

[75] Inventors: Bernard M. Gordon, Magnolia; Leopold Neumann, Lexington; Ivan H. Kirsch, Hyde Park, all of Mass.

[73] Assignee: Gordon Engineering Company, Wakefield, Mass.

[22] Filed: May 15, 1970

[21] Appl. No.: 37,752

[52] U.S. Cl. ............................................. 73/339 A
[51] Int. Cl. ............................................. G01k 11/24
[58] Field of Search ............... 73/339 A, 194 A, 67.8

[56] References Cited

UNITED STATES PATENTS 3,350,942   11/1967   Peltola.............................73/339 A

OTHER PUBLICATIONS

NASA Tech. Brief; Brief Number 68-10319; August 1968, Ultrasonic Temperature Measuring Device.

*Primary Examiner*—Louis R. Prince
*Assistant Examiner*—Denis E. Corr
*Attorney*—Morse, Altman & Oates

[57] ABSTRACT

A transmitter pulse generator and a receiver detector analyzer electrically communicate with a transmit/receiver ultrasonic transducer which is connected to a lead-in-line having a sensor at one end thereof. Driving pulses generated by the transmitter are applied to the transducer, in consequence ultrasonic pulses propogate down the lead-in-line toward the sensor. Each ultrasonic pulse is reflected partly upon reaching a discontinuity in the sensor and partly upon reaching the termination of the sensor. The reflected pulses or sensor echo pulse pairs are applied to the receiver detector analyzer via the lead-in-line and transducer. A first peak detect and hold circuit and a second peak detect and hold circuit are charged individually to a reference level by the first and second pulse, respectively, of initial sensor echo pairs. The time interval during which the first and second pulses of subsequent sensor echo pairs exceed their correlative reference levels is detected by a first comparator and a second comparator, respectively. The detected time interval is measured by a reference oscillator and a gated counter. The measure interval is presented on a display as an indication of the temperature of the sensor.

13 Claims, 2 Drawing Figures 3,717,033

ULTRASONIC APPARATUS, PARTICULARLY FOR THERMOMETRY

BACKGROUND OF THE INVENTION

1. Field of Invention

The present invention relates to high temperature thermometry and, more particularly, to ultrasonic thermometry.

2. Description of the Prior Art

Difficulties have been encountered with temperature measuring instruments, particularly in nuclear thermometry, due to severe environment conditions, compatibility of materials and geometrical restrictions. The general approach to nuclear thermometry has been based on thermocouples. Basically, the thermocouple consists of two dissimilar metallic wires joined at one end. When the junction end is at a different temperature than the free ends, a voltage proportional to the temperature difference is developed across the junction. Since such a temperature measurement depends upon electrical properties, the thermocouple is susceptible to electric noise and low frequency vibrations which represent measurement errors. In addition, the stringent requirements placed on the materials and physical configuration of thermocouple sensors makes the use of such sensors impractical in certain situations.

SUMMARY OF THE INVENTION

An object of the present invention is to provide an ultrasonic thermometric apparatus which is characterized by a pulse generator for supplying driving pulses to a transmit/receiver transducer, a lead-in-line having a sensor at one end thereof, a receiver amplifier for accepting sensor echoes reflected by the sensor, a pair of peak detect and hold circuits which are charged to reference threshold levels by initial sensor echoes, a pair of comparators for detecting sensor echoes which exceed the reference threshold levels, a precision reference oscillator and a gated counter for measuring the detected interpulse period and a display for presenting the interpulse period count as a measure of the temperature of the sensor. The combination of pulse generator, transducer, lead-in-line, sensor, receiver amplifier, peak detect and hold circuits, comparators, reference oscillator and gated counter and display is such as to provide a versatile and precise ultrasonic thermometric apparatus which is not hampered by the inherent limitation associated with thermocouples.

The invention accordingly comprises the ultrasonic apparatus possessing the construction and combination of elements, and arrangements of components that are exemplified in the following detailed disclosure, the scope of which will be indicated in the appended claims.

BRIEF DESCRIPTION OF THE DRAWING

For a fuller understanding of the nature and objects of the present invention, reference should be had to the following detailed description of the preferred embodiment depicted in the accompanying drawing wherein.

DETAILED DESCRIPTION OF THE PREFERRED EMBODIMENT

Figure 1:
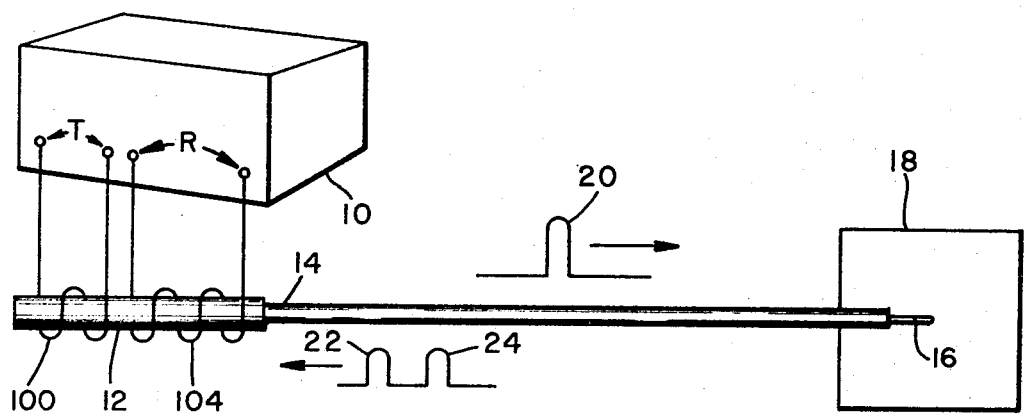
FIG. 1 is a schematic representation, certain mechanical features being shown in perspective, of an ultrasonic thermometric apparatus embodying the present invention.

Generally, the ultrasonic thermometric apparatus of FIG. 1 comprises a transceiver 10 which communicates with a transducer 12, a lead-in-line 14 having one of its ends connected to transducer 12 and the other end connected to a sensor 16. By way of illustration, sensor 16 is shown as being positioned within a high temperature environment 18. Transducer 12, for example a magnostrictive transducer, is energized by a sequence of driving pulses from transceiver 10, whereby a series of ultrasonic pulses propogate along lead-in-line 14 toward sensor 16. Each of the ultrasonic pulses is reflected partly upon reaching a discontinuity in sensor 16 and partly upon reaching the termination of sensor 16, whereby sensor echo pulse pair 22, 24 are reflected back along lead-in-line 14 for each ultrasonic pulse 20. The sensor echo pairs are converted into electrical pulses by transducer 12 and applied to transceiver 10. As hereinafter delineated, the time duraction of the interpulse period between each pulse of each sensor echo pair is measured in transceiver 10. Since the time duration of the interpulse period varies as a function of the temperature of sensor 16, the measured interpulse period is related directly to the temperature about sensor 16.

Figure 2:
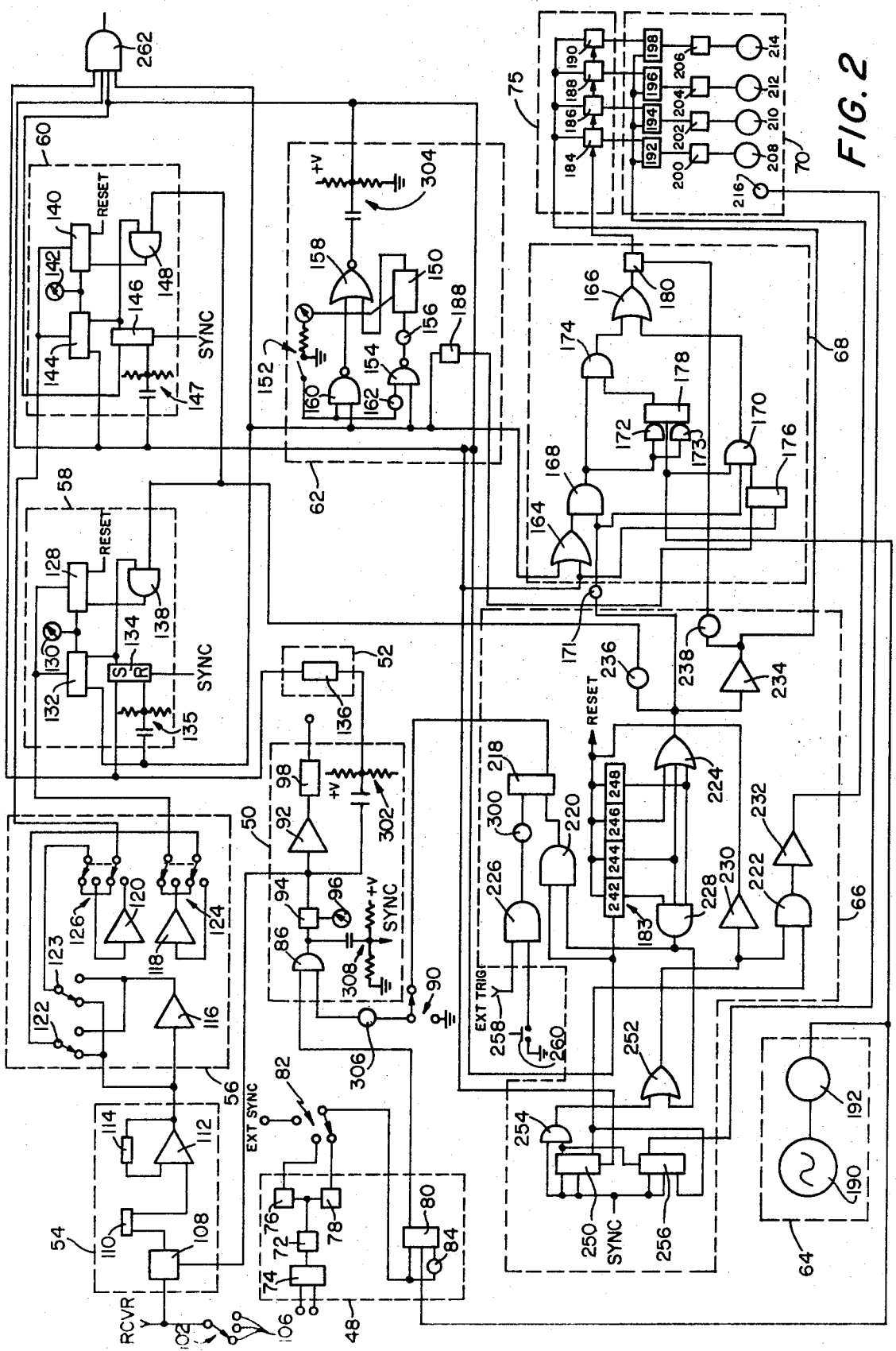
FIG. 2 is a block and schematic diagram of the transceiver of FIG. 1.

Now referring to the block and schematic diagram of FIG. 2. Generally, transceiver 10 comprises a cycle control 66 for initiating and controlling the measuring process; and internal reference clock 64 for providing a sequence of time reference pulses; a drive pulse source and synchronizer 48 for generating a pulse rate synchronized with reference clock 64; a pulse generator 50 for supplying a sequence of driving pulses to transducer 12; a blanking delay 52 for generating a blanking pulse to evaluator 58; a receiver amplifier 54 for receiving sensor echo pairs from transducer 12; and inverter amplifier unit 56 for enabling further amplification and polarity inversion of the sensor echoes as at the output of receiver amplifier 54; evaluators 58 and 60, each responding to one pulse of each sensor echo pair as at the output of inverter amplifier unit 56; an echo selector 62 for blanking evaluator 60 during part of the interpulse period between pulses of selected sensor echo pairs; a counter gate 68 for measuring the interpulse period between pulses of selected sensor echo pulse pairs and for controlling the entry of reference pulses into a counter 75; and a display 70 for presenting the measured interpulse period count. The electronic components comprising cycle control 66, drive pulse source and synchronizer 48, pulse generator 50, blanking delay 52, receiver 54, inverter amplifier unit 56, evaluators 58 and 60, echo selector 62, clock 64, counter gate 68, counter 75, and display 70 will be described in conjunction with the description of transceiver 10 operation.

In operation, the output of an isolation transformer and full wave rectifier network 74 is applied to a trigger 72, whereby pulses of predetermined repetition rate are presented at the output of trigger 72. In one example, 115 volts 60 Hertz is applied to the input terminals of network 74 and the pulses as at the output of trigger 72 have a repetition rate of 120 Hertz. The pulses as at the output of trigger 72 are applied to a shaper 76 and a divider 78, in consequence the pulse rate of the signals as at the output of shaper 76 and divider 78 and 120 Hz and 60 Hz, respectively. Either an external signal or the signal as at the output of shaper 76 or divider 78 is applied to the J and K input terminals of a flip-flop 80 via a pulse rate selector switch 82. Flip-flop 80 is clocked by internal reference clock 64. An inverter 84 is connected between the pole of switch 82 and the K input terminal, in consequence the signal as at the output of flip-flop 80 is of the same rate as at the J,K input terminals and its transistion is synchronized with internal reference clock 64. The signal as at the output of flip-flop 80 is applied to an AND gate 86.

An AND situation is established at the input of AND gate 86 by the signal as at the output of flip-flop 80 and by the signal as at the pole of switch 90. In one position of switch 90, AND gate 86 is enabled continuously allowing through a continuous pulse stream. In the other position of switch 90, an external trigger from cycle control 66 is applied to AND gate 86 through an inverter 306. In this case, a group of twelve pulses are allowed through AND gate 86 for each external trigger. The signal as at the output of AND gate 86 is applied to a differentiating network 308, the differentiated signal being designated a sync signal.

The signal as at the output of AND gate 86 is applied also to an amplifier 92 via a delay flop 94, the pulse width of the signal as at the output of delay flop 94 being governed by a variable control 96. Driving pulses as at the output of amplifier 92 are applied to transducer 12 via an impedance matching network 98 and transmit coil 100, in consequence driving pulse propogate along lead-in-line 14 toward sensor 16. The sensor echo pairs reflected from sensor 16 are applied to the input of receiver amplifier 54 via transducer 12, a receiver coil 104 and a switch 102. Switch 102 is provided with a plurality of input terminals 106 for selective reception of signals from a plurality of receiver coils (not shown). The sensor echo pairs input a limiting and blanking network 108.

Limiting and blanking network 108 is controlled by the signal as at the output of delay flop 94, in consequence receiver amplifier 54 is blanked during the "main bang" portion of the transmitted driving pulses. The signal as at the output of network 108 is attenuated in a range adjust switching network 110 and is applied to the input of an amplifier 112, the gain of which is governed by a variable control 114. The signal as at the output of amplifier 112 inputs inverter amplifier unit 56.

Inverter amplifier unit 56 comprises an inverter 116, booster amplifier 118 and 120, echo polarity switches 122 and 123 and echo booster switches 124 and 126. The polarity of the sensor echoes as at the input of evaluators 58 and 60 is controlled by switches 122 and 123. That is, the polarity of the sensor echoes as at the output of amplifier 122 is applied directly to the evaluators when switches 122 and 123 are in their first position (as shown) and the opposite polarity of the sensor echoes as at the output of amplifier 112 is applied to the evaluators via inverter 116 when switches 122 and 123 are in their second position. The magnitude of the sensor echoes which input evaluators 58 and 60 is governed by switches 124 and 126, respectively, i.e. the magnitude of the sensor echoes as at the output of switches 122 and 123 is increased when switches 124 and 126 are set to pass the signals through amplifiers 118 and 120. The sensor echoes as at the output of switches 124 and 126 are applied to evaluators 58 and 60, respectively.

Evaluator 58 comprises a peak detect and hold circuit 128, which is controlled by an AND gate 138 and a peak reset input signal; a threshold level set 130 for adjusting the magnitude of the threshold level as a fraction of the stored peak reference in peak detect and hold circuit 128; a comparator 132 for sensing when the input sensor echo exceeds the threshold level; a control flip-flop 134 for enabling both comparator 132 and peak detect and hold circuit 128; and a differentiating network 135 at the R input of control flip-flop 134. When the inputs to AND gate 138 are true, peak detect and hold circuit 128 charges to the peak of the sensor echo as at its input. When any of the AND gate 138 inputs are false, peak detect and hold circuit 128 retains its previously acquired peak reference level. The stored peak reference level established in peak detect and hold circuit 128 is discharged to a minimum reference value by a reset signal applied thereto, in consequence a threshold level safely above the sensor echo line noise level is established therein. Flip-flop 134, set by an "end of blanking delay signal", enables comparator 132 and peak detect and hold circuit 128.

Blanking delay 52 comprises a differentiating trigger network 302 driven from delay flop 94 of pulse generator 50 and a delay flop 136. Delay flop 136 is triggered by the transmitted pulse and operates to delay the enabling of evaluator 58 until the conclusion of the delay, in consequence any spurious sensor echos preceeding the desired echo pair are rejected.

During the first two sensor echo pairs of a measurement, the previously reset peak detect and hold circuit 128 charges to the peak value of the first pulse of the first and second sensor echo pairs. The comparator action resets flip-flop 134 at the peak end and thus disables further action by evaluator 58. During the second ten pulses of a measurement, peak detect and hold circuit 128 retains its acquired reference and sets a threshold level for comparator 132 via threshold level set 100. The first pulse of subsequent sensor echo pairs which exceeds the threshold level is detected by comparator 132. When the selected sensor echo pulse decreases below the threshold level, flip-flop 134 is reset, in consequence evaluator 58 is disabled. In any event, flip-flop 134 is reset by the sync signal, whereby a proper starting condition is presented even in a fault condition.

Evaluator 60 is identical to evaluator 58, but is connected to operate on the second pulse of each sensor echo pair. Evaluator 60 comprises peak detect and hold circuit 140, a threshold level set 142, a comparator 144, a control flip-flop 146, an AND gate 148 and a differentiating network 147. Evaluator 60 is enabled by the pulse from echo selector 62.

Echo selector 62 delays the enabling evaluator 60 during part of the time interval between the pulses of selected sensor echo pair and hence aids in rejecting spurious echoes during the interpulse period. Echo selector 62 comprises a delay flop 150 which is controlled by a variable echo selector delay control and enable switch 152; and NAND gate 154 having its output connected to delay flop 150 via an inverter 156; a NOR gate 158 having its output connected to control flip-flop 146 via a differentiating network 304 and one of its inputs connected to the output of delay flop 150; and a NAND gate 160 having one of its inputs connected to control flip-flop 134, the other input of NAND gate 160 is connected to switch 152 and the input of NAND gate 154 via an inverter 162. When the switch 152 is in the off position, the signal as at the output of NOR gate 158 is such that evaluator 60 enabling is delayed until the signal as at the output of delay flop 150 causes NOR gate 158 to change state.

For convenience and by way of example, a measuring cycle has been defined as 12 driving pulses and 24 sensor echoes, each driving pulse being reflected as a pair of sensor echoes. The first two echo pairs as at switches 124 and 126 set the threshold level in peak detect and hold circuits 128 and 140, respectively, the first pulse of each pair setting the threshold level in peak detect and hold 128 and the second pulse of each pair setting the threshold level in peak detector and hold 140. The first and second pulse of each of the remaining sensor echo pairs are evaluated in comparators 132 and 134, respectively. An output signal is generated by evaluator 58 during the period that the first pulse of the evaluated sensor echo pair exceeds the threshold level established therein and an output signal is generated by evaluator 60 during the period that the second pulse of the evaluated sensor echo pair exceeds the threshold level established therein. The signals as at the outputs of evaluators 58 and 60 input counter gate 68.

Counter gate 68 comprises OR gates 164 and 166; AND gates 168, 170, 172, 173 and 174; a flip-flop 176; and dividers 178 and 180. One of the inputs of OR gate 164 is connected to comparator 132 and the other input is connected to comparator 144. One of the inputs of flip-flop 176 is connected to comparator 132 via a differentiator 188 and the other input of flip-flop 176 is connected directly to comparator 144. In the preferred embodiment of the present invention, divider 178 is a divide by two and divider 180 is a divide by ten. AND gate 170 and divider 178 are inputed by the clock pulses generated by clock 64.

Clock 64 is comprised of an oscillator 190, for example a 10 MHz crystal oscillator, and a buffer amplifier 192. During the time that the first of the pair of the selected sensor echo pulses exceeds the threshold level, 5 MHz pulses as at the output of the divider 178 are applied to counter 75 via AND gate 174, OR gate 166 and divider 180. Divider 178 is enabled by the signal from comparator 132 via OR gate 164 and AND gate 168 and 172. When the first pulse of the pair of the selected sensor echo pairs falls below the threshold level, OR gate 164 is disabled and flip-flop 176 is set, in consequence AND gate 170 is enabled and 10 MHz pulses are applied to counter 75 via AND gate 170, OR gate 166 and divider 180. The output signal from evaluator 60, i.e. the second of the pair of the selected sensor echo pulses which exceeds the threshold level, resets flip-flop 176 and also enables OR gate 164, whereby 5 MHz pulses are applied to counter 75. When the second of the pair of the selected sensor echo pulses falls below the threshold level, a counter 183 in cycle control 66 is pulsed advancing its count. In summary, the output signals of evaluators 58 and 60 are processed in such a manner that a pulse train of 5 MHz is applied to counter 75 during the time that respective pulses of selected sensor echo pulse pair exceed their threshold level and a pulse train of 10 MHz is applied to counter 75 during the interpulse period.

Counter 75 comprises high speed counters 184, 186, 188 and 190. Display 70 comprises laching registers 192, 194, 196 and 198; decoders 200, 202, 204 and 206; numerical indicators 208, 210, 212 and 214; and fault indicator 216. The counters, registers, decoders and numerical indicators are interconnected in such a manner that one counter inputs one register, one register inputs one decoder and one decoder inputs one numerical indicator; i.e., counter 184 inputs register 192, register 192 inputs decoder 200, decoder 200 inputs numerical indicator 208, and so one. The numerical display presented by indicators 208, 210, 212 and 214 is the average interpulse period between the first and second pulse of the third through twelfth sensor echo pulse pairs. At the end of a measurement cycle, the data in counters 184, 186, 188 and 190 is transferred to latching registers 192, 194, 196 and 198, respectively and is displayed, the correlative decoders and counters are reset to accept another measurement. Input strobing to registers 192, 194, 196 and 198 are controlled by the signal as at the output of cycle control 66.

Cycle control 66 comprises counter 183; flip-flop 218, 250 and 256; AND gates 220, 222, 226, 228 and 254; OR gates 224 and 252; amplifiers 230, 232 and 234; and inverters 236 and 238. Counter 183 comprises flip-flop 242, 244, 246 and 248. Counter 183 is incremented at the end of the detection of each second pulse of each echo sensor pair, hence it counts the number of driving pulses and controls the 12 pulse measurement cycle. Counter 183 is reset to state ZERO by the signal as at the output of amplifier 230 which is inputed by the signal as at the output of OR gate 252. At the same time, counters 184, 186, 188 and 190 are strobed to registers 192, 194, 196 and 198 by the control signal as at the output of AND gate 222 via amplifier 232. Thereafter, counters 184, 186, 188 and 190 are reset. The counter states ZERO and ONE are detected by OR gate 224 and control peak detect action in evaluators 58 and 60, whereby counting by the counter gate is inhibited. During states 2 through 11, OR gate 224 controls the hold peak in evaluators 58, 60 and enables the counter gate. The signal as at the output of OR gate 224 is applied to AND gate 168 via an inverter 171. Flip-flop 218, a single measurement control element, is set by the signal as at the output of an inverter 300 which is inputed by AND gate 226. AND gate 226 is inputed by either an external trigger 258 or by a ground when switch 260 is depressed. Flip-flop 218 is reset via AND gate 220 when counter is in state 11 and the last sensor echo is detected. Flip-flop 218 enables pulse generator 50 to transmit a single 12 pulse group.

Flip-flops 254 and 256 constitute a fault detector. Flip-flop 254 is set by a sync pulse (start of transmitted pulse signal) and is reset by the second echo detection.

However, during a fault condition flip-flop 254 is not reset. The next sync pulse will enable AND gate 254 and, if flip-flop 250 is set, it will energize OR gate 254 reseting counter 183. If AND gate 222 is disabled, faulty data is not transferred to display 70. At the time of the next sync pulse, the state of flip-flop 250 is transferred to flip-flop 256, in consequence fault indicator 216 is energized.

The signals as at the output of comparator 146, NOR gate 158 and delay flop 136 are individually applied to the correlative input terminals of an AND gate 262, the signal as at the output of AND gate 262 being a composite waveform representing transceiver operation. The signal as at the output of delay flop 136 is applied to the input of AND gate 262 via a differentiating network 302. It will be readily appreciated that a plurality of physical properties can be ascertained by the measurement technique described herein, for example elastic moduli, Poisson's ratio, metallurgical properties (recovery, recrystallization, grain growth, etc.) chemical properties (carbiding, nitriding, oxidizing, reducing, etc.), nuclear effects and so on.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. An ultrasonic apparatus comprising:
   a. pulse generator means for sending a sequence of driving pulses;
   b. transducer means driven by said pulse generator, for converting the driving pulses to ultrasonic pulses;
   c. sensor means electrically communicating with said transducer, said ultrasonic pulses being reflected back by said sensor means as sensor echo pairs; and
   d. receiver means for receiving said sensor echo pulses and analyzing them to determine their interpulse period;
   e. a first evaluator operatively connected to said receiver, a threshold level being established in said first evaluator by the first pulse of initial sensor echo pairs, said first evaluator providing an output signal when subsequent first pulses of said sensor echo pairs exceed the threshold level established therein; and
   f. a second evaluator operatively connected to said receiver, a threshold level being established in said second evaluator by the second pulse of initial sensor pairs, said second evaluator providing an output signal when subsequent second pulses of said sensor echo pairs exceed the threshold level established therein.

2. The apparatus as claimed in claim 1 including:
   a. counter means logically communicating with said first and second evaluators for measuring the time interval between said first and second pulse of subsequent sensor echo pairs during which said first and second pulse exceed their correlative threshold levels and the time during which echoes exceed threshold levels; and
   b. display means operatively connected to said counter means for presenting a numerical display representing the average time interval between said first and second pulses of subsequent sensor echo pairs during which said first and second pulses exceed their correlative threshold levels.

3. The apparatus as claimed in claim 2 including means for adding an additional half frequency count.

4. An ultrasonic apparatus comprising:
   a. pulse generator means for sending a sequence of driving pulses;
   b. transducer means driven by said pulse generator, for converting the driving pulses to ultrasonic pulses;
   c. sensor means electrically communicating with said transducer, said ultrasonic pulses being reflected back by said sensor means as sensor echo pairs;
   d. receiver means for receiving said sensor echo pulses and analyzing them to determine their interpulse period;
   e. a blanking delay electrically communicating with said pulse generator and receiver for selectively blanking said receiver;
   f. time reference and counter means for digitizing the interpulse period;
   g. a first evaluator operatively connected to said receiver, a threshold level being established in said first evaluator by the first pulse of initial sensor echo pairs, said first evaluator providing an output signal when subsequent first pulses of said sensor echo pairs exceed the threshold level established therein;
   h. a second evaluator operatively connected to said receiver, a threshold level being established in said second evaluator by the second pulse of initial sensor pairs, said second evaluator providing an output signal when subsequent second pulses of said sensor echo pairs exceed the threshold level established therein;
   i. counter means logically communicating with said first and second evaluators for measuring the time interval between said first and second pulse of subsequent sensor echo pairs during which said first and second pulse exceed their correlative threshold levels and adding an additional half frequency; and
   j. display means operatively connected to said counter gate for presenting a numerical display representing the average time interval between said first and second pulse of subsequent sensor echo pairs during which said first and second pulses exceed their correlative threshold levels.

5. The apparatus as claimed in claim 4 including an inverter operatively connected to said receiver for selectively controlling the polarity of the sensor echo pulses as at the input of said first and second evaluators.

6. The apparatus as claimed in claim 5 wherein said first evaluator comprises:
   a. first peak detect and hold means operatively connected to said receiver for establishing a threshold level as a function of the first pulse of initial sensor echo pairs; and
   b. first comparator means electrically connected to said first peak detect and hold means for detecting the first pulse of subsequent sensor echo pairs which exceed the threshold established by said first peak detect and hold means; and said second evaluator comprises:

c. second peak detect and hold means operatively connected to said receiver for establishing a threshold level as a function of the second pulse of initial sensor echo pairs; and d. second comparator means connected to said second peak detect and hold means for detecting the second pulse of subsequent sensor echo pairs which exceed the threshold established by said second peak detect and hold means.

7. The apparatus as claimed in claim 6 including echo selector means logically connected to said second comparator for delaying the enabling of said second comparator during part of the time interval between the first and second pulse of said sensor echo pairs.

8. The apparatus as claimed in claim 7 wherein said transducer is a magnostrictive transducer.

9. The ultrasonic apparatus as claimed in claim 7 wherein said sensor has at least two discontinuities, portions of each of said ultrasonic pulse being reflected by each of said discontinuities.

10. An ultrasonic apparatus comprising:
a. a pulse generator for generating a sequence of driving pulses;
b. transducer means coupled to said pulse generator for converting the driving pulses to ultrasonic pulses;
c. sensor means electrically communicating with said transducer, said ultrasonic pulses being reflected back by said sensor means as sensor echo pairs;
d. a receiver coupled to said transducer for receiving said sensor echo pulses;
e. first peak detect and hold means operatively connected to said receiver for establishing a threshold level as a function of the first pulse of initial sensor echo pairs;
f. second peak detect and hold means operatively connected to said receiver for establishing a threshold level as a function of the second pulse of initial sensor echo pairs;
g. first comparator means electrically connected to said first peak detect and hold means for detecting the first pulse of subsequent sensor echo pairs which exceed the threshold established in said first peak detect and hold means;
h. second comparator means electrically connected to said second peak detect and hold means for detecting the second pulse of subsequent sensor echo pairs which exceed the threshold established in said second peak detect and hold means;
i. counter means logically communicating with said first and second comparators for measuring the time interval between said first and second pulses of subsequent sensor echo pairs during which said first and second pulses exceed their correlative threshold levels;
j. display means operatively connected to said counter means for presenting a numerical display representing the average time interval between said first and second pulses of subsequent sensor echo pairs during which said first and second pulses exceed their correlative threshold levels.

11. The apparatus as claimed in claim 10 wherein said apparatus includes:
a. a blanking delay electrically communicating with said pulse generator and receiver for selectively blanking said receiver;
b. an inverter amplifier unit operatively connected to said receiver for selectively controlling the polarity of the sensor echo pulses as at the input of said first and second peak detect and hold means and first and second comparator means;
c. a clock operatively connected to said counter means for providing a sequence of timing pulses;
d. a cycle control logically connected to said counter means and first and second peak detect and hold means for controlling the sampling times of said first and second peak detect and hold means; and
e. an echo selector logically connected to said second comparator for delaying the enabling of second comparator during part of the time interval between the first and second pulse of said sensor echo pairs.

12. An ultrasonic apparatus comprising:
a. a pulse generator for generating a sequence of driving pulses;
b. a transducer connected to said pulse generator for converting the driving pulses to ultrasonic pulses;
c. a sensor operatively connected to said transducer, said sensor having at least two discontinuities, portions of each of said ultrasonic pulses being reflected by each of said discontinuities as sensor echo pair pulses, said sensor being in a temperature environment; and
d. evaluator means connected to said transducer for determining the interpulse period between each pulse of each of said sensor echo pair, threshold levels being established in said evaluator means by an initial sensor echo pair pulses, said evaluator generating signals when subsequent sensor echo pair pulses exceed said established threshold levels, said interpulse period representing the temperature environment about said sensor.

13. An ultrasonic apparatus comprising:
a. pulse generator for generating a sequence of driving pulses;
b. a transducer connected to said pulse generator for converting the driving pulses to ultrasonic pulses;
c. a lead-in-line connected to said transducer, said ultrasonic pulses propogating along said lead-in-line;
d. a sensor connected to said lead-in-line, said sensor having at least two discontinuities, portions of each of said ultrasonic pulse being reflected back along said lead-in-line by each of said discontinuities as sensor echo pair pulses, said sensor being in a temperature environment;
e. a receiver connected to said transducer for receiving said sensor echo pulses;
f. a blanking delay electrically communicating with said pulse generator and receiver for selectively blanking said receiver;
g. first peak detect and hold means operatively connected to said receiver for establishing a threshold level as a function of the first pulse of initial sensor echo pairs;
h. second peak detect and hold means operatively connected to said receiver for establishing a threshold level as a function of the second pulse of initial sensor echo pairs;

i. first comparator means connected to said first peak detect and hold means for detecting the first pulse of subsequent sensor echo pairs which exceed the threshold established by said first peak detect and hold means;

j. second comparator means connected to said peak detect and hold means for detecting the second pulse of subsequent sensor echo pairs which exceed the threshold established by said second peak detect and hold means;

k. an inverter amplifier unit operatively connected to said receiver for selectively controlling the polarity of the sensor echo pulses as at the input of said first and second peak detect and hold means and said first and second comparator means;

l. an echo selector logically connected to said second comparator for blanking said second comparator during part of the time interval between the first and second pulse of said sensor echo pairs;

m. a counter gate logically communicating with said first and second comparators for measuring the time interval between said first and second pulse of subsequent sensor echo pairs during which said first and second pulse exceed their correlative threshold levels;

n. a clock operatively connected to said counter for providing a sequence of timing pulses;

o. a cycle control for controlling the apparatus that counts the second comparator outputs and divides the measurement cycle into a peak detect phase and a measurement averaging phase and ends by strobing said counter count; and p. a display connected to said counter gate for presenting a numerical display representing the temperature of the environment about said sensor.

* * * * *